United States Patent [19]

Abernathy

[11] Patent Number: 4,684,427

[45] Date of Patent: Aug. 4, 1987

[54] METHOD OF FORMING AN IMPROVED HOSE BUNDLE

[75] Inventor: Earl D. Abernathy, Magnolia, Tex.

[73] Assignee: Multiflex, Inc., Houston, Tex.

[21] Appl. No.: 807,102

[22] Filed: Dec. 6, 1985

Related U.S. Application Data

[63] Continuation of Ser. No. 583,669, Feb. 27, 1984, abandoned.

[51] Int. Cl.⁴ .............................................. B29C 47/02
[52] U.S. Cl. ............................... 156/244.12; 138/111;
138/114; 156/244.13; 156/244.25; 156/296;
264/279.1; 428/378
[58] Field of Search ....................... 138/111, 112, 114;
174/47, 68 C, 95; 156/244.12, 244.13, 244.25,
296; 264/279.1; 428/378

[56] References Cited

U.S. PATENT DOCUMENTS

| | | | |
|---|---|---|---|
| 480,573 | 8/1892 | Flagg | 138/111 X |
| 660,292 | 10/1900 | Dürr | 138/114 |
| 2,578,280 | 12/1951 | Barnard | 138/111 X |
| 2,997,529 | 8/1961 | Fink | 156/296 X |
| 3,222,149 | 12/1965 | Drummond | 156/296 X |
| 3,512,581 | 5/1970 | Lawton | 138/114 X |
| 3,589,960 | 6/1971 | Hood et al. | 156/296 X |
| 3,853,149 | 12/1974 | Stine | 138/111 |
| 4,262,703 | 4/1981 | Moore et al. | |
| 4,309,869 | 1/1982 | Boyce | |

FOREIGN PATENT DOCUMENTS

| | | | |
|---|---|---|---|
| 242356 | 10/1982 | Australia | 138/111 |
| 563812 | 9/1958 | Canada | 138/111 |
| 676224 | 7/1952 | United Kingdom | 138/111 |

Primary Examiner—Robert A. Dawson
Attorney, Agent, or Firm—Pravel, Gambrell, Hewitt & Kimball

[57] ABSTRACT

An improved hose bundle which has a central core, at least one layer of flexible hoses or conduits around the core, and an external sheath, and includes an intermediate sleeve member of predetermined thickness disposed between the core and the first layer of hoses or conduits to provide the hoses or conduits with a substantially cylindrical outer shape without using fillers or leaving spaces between the hoses or conduits.

8 Claims, 3 Drawing Figures

U.S. Patent   Aug. 4, 1987   4,684,427
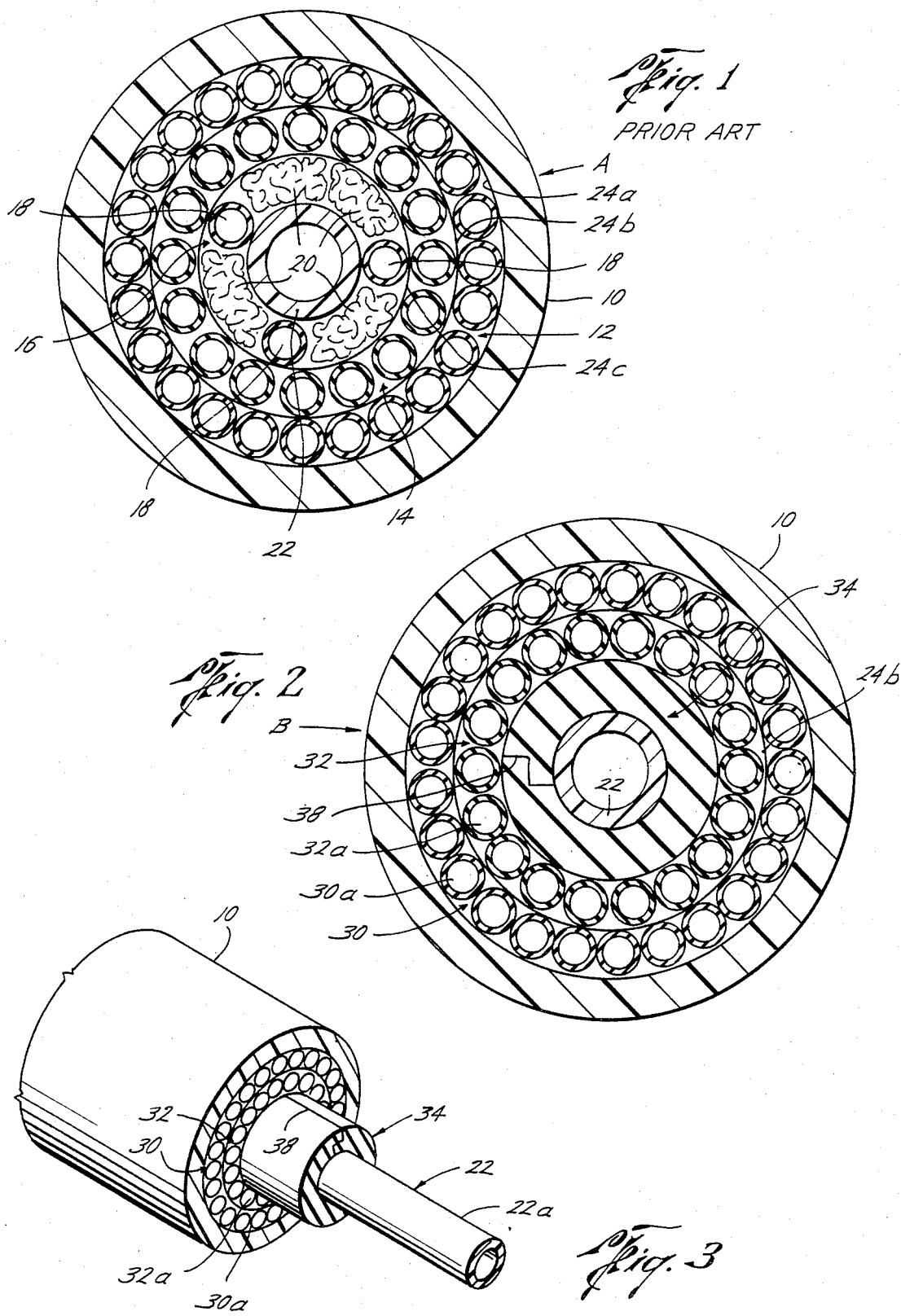

METHOD OF FORMING AN IMPROVED HOSE BUNDLE

This is a continuation of application Ser. No. 583,669 filed on Feb. 27, 1984 and now abandoned.

BACKGROUND OF THE INVENTION

The invention relates to an improved hose bundle, and in particular to an improvement in hose bundles such as those having fluid or electric control lines which extend from control equipment to a petroleum well at a location which is remote from the control equipment.

In the field of petroleum production, numerous hoses and other conduits, often several hundred feet in length, are used for controlling valves and other equipment associated with a petroleum well. For example, blowout prevention devices located underwater at a well require a plurality of hoses or conduits extending from the equipment located above the water for separately operating a plurality of hydraulic, pneumatic and/or electrically operated valves. As can be appreciated, it is important that such hoses or conduits be secured to prevent tangling, kinking or damage and are preferably secured such that they are capable of being handled with pulleys, reels and the like. For this reason, the hoses or conduits leading to a particular area of the well, e.g. a blow out prevention device, are frequently secured together to form a unitized bundle. The term "conduit" as used herein is intended to include hoses for fluid as well as electrical cables or wires, wire ropes or other elongate members.

One technique for forming a unitized bundle of conduits is taught in U.S. Pat. No. 4,309,869 to Boyce. As taught therein, the hoses are wrapped about a central core, in multiple layers, using the apparatus disclosed in the patent. After the bundle is collected on a collecting reel, a covering or sheath is extruded about the bundle to provide an overall flexible protective coating for the bundle. In the past, when the number of hoses needed in any particular multi-conduit line was less than the number necessary to form a substantially cylindrical layer about the central core, fillers such as fiber rope have been used for filling up the spaces.

Spaces or voids within the bundle are undesirable for several reasons. One reason is that voids permit the hoses to move within the extruded protective layer during manufacture and handling and thereby increase the risk of damage to the hoses. Although the industry has accepted the use of fiber fillers for many years, their use has drawbacks. For example, although fiber rope initally creates a relatively tight bundle, the fiber tends to compress and become displaced as the bundle is handled in service. Moreover, the fiber filler is more susceptible to general deterioration and rotting than the other components of the bundle. In general, such bundles are not sealed at their ends so that, when used in undersea wells, sea water can enter the bundle and hasten deterioration of fillers. Compression and/or deterioration of the filler can lead to movement of the conduits within the outer sleeve and a return to the problems noted above. In addition, because of the compressibility of the filler material, its use often results in a bundle of irregular cross-section.

To decrease the compression and deterioration problems, scrap plastic tubing has sometimes been used instead of fiber rope fillers. Although the use of such plastic tubing is a partial solution to the problem, the addition of tubing filler has required that the cabling machine be utilized to incorporate the filler in the bundle. This frequently involves an additional pass of the cabling machine over the core which significantly increases the time and labor costs of manufacturing the bundle.

Another problem with the use of fillers is that their incorporation results in a bundle which does not have uniform impact resistance or compressibility. In other words, the fillers have different impact and stress resistance than the adjacent hoses and hence create local areas which are more susceptible to impact or compression damage. Thus, the fillers result in overall bundle durability less than would be obtained in the absence of such fillers. Typically circular clamps are used to secure the bundle to ropes for lowering it to the ocean floor in an undersea well, and to maintain the bundle in position to prevent stress on the connections between the bundle hoses and associated control devices. These clamps represent a constant external load on the bundle in service. When fillers are used, the load is imbalanced relative to the bundle hoses which, as can be appreciated, is detrimental to the integrity and consequent durability of the bundle, effectively decreasing its serviceable life. In general, the more filler incorporated in a bundle, the less durable it will be in service.

U.S. Pat. No. 4,262,703 to Moore et al. teaches a technique for minimizing damage from impacts to a bundle of control lines. The Moore technique includes incorporating wire ropes of slightly larger diameter than the hoses to provide impact-resistant, load-bearing members to prevent planar forces from directly contacting the protected control lines. Although incorporating wire ropes may improve impact resistance of a bundle, the ropes usually lead to a bundle having an irregular or non-circular cross-section, which again would not react uniformly to external, non-impact type loading, e.g. by securing clamps.

In addition to having a more durable bundle, it would also be advantageous to have a unitized hose bundle which has a generally circular, relatively uniform overall cross-section for ease in utilizing pulleys, for packaging on reels, as well as for maximizing durability.

SUMMARY OF THE INVENTION

The invention relates to an improved conduit or hose bundle such as those used for operating remote devices at a petroleum well, of the type including an inner core of predetermined diameter surrounded by a plurality of hoses or other conduits, each having a diameter smaller than the core diameter. In accordance with the invention, the improved bundle includes an intermediate sleeve for spacing the plurality of conduits from the inner core a predetermined distance to permit arrangement of the plurality of conduits in one or more substantially concentric, closed circular layers or rings about the core in close contact with one another. The thickness of the intermediate sleeve or spacer layer is predetermined by the number of the surrounding conduits and their individual diameters relative to the diameter of the inner core and the desired finished diameter of the unitized bundle.

The intermediate sleeve is preferably formed of a resilient, extrudable material which does not adhere to the inner core when extruded thereover. By eliminating a manufacturing step, e.g. additional passes of a cabling machine for insertion of strand type fillers such as fiber rope or scrap tubing, the intermediate sleeve significantly decreases manufacturing costs of a bundle. In the preferred embodiment, the intermediate sleeve is extruded over a bundle core in a single step requiring a relatively short period of time before using the cabling machine to assemble conduits about the core and sleeve.

In addition to reducing manufacturing costs, the resiliency and thickness of the intermediate sleeve beneficially increase the durability of the bundle by providing more flexibility and cushioning to the inner core and increasing the bending moment of the bundle.

In a preferred embodiment, the extrudable material has properties different from the core material which it is to be extruded over such that the extruded sleeve will not adhere to the core. In this manner, end portions of the sleeve can be easily stripped from the core for ease in connecting the core to remote devices. Additional facilities for removal of the end portion of the sleeve include providing a conventional knit line in the sleeve during extrusion formation of the sleeve.

The intermediate sleeve further assures that a unitized bundle of conduits will have a substantially circular cross-section or cylindrical shape to enhance and facilitate the securing of the bundle to associated structural members by clamps of standard size. The uniformly shaped bundle also increases the ease in the handling of the bundle, for example, on reels or pulleys or other places where bending or curvature of the bundle occurs.

BRIEF DESCRIPTION OF THE DRAWING

FIG. 1 is a cross-sectional view of a prior art hose bundle having fiber fillers therein.

FIG. 2 is a cross-sectional view of a preferred embodiment of the invention.

FIG. 3 is a prospective view of the preferred embodiment of FIG. 2, illustrating the central core preparatory to its connection to associated control devices.

DETAILED DESCRIPTION OF THE PREFERRED EMBODIMENT

FIG. 1 illustrates a prior art hose bundle A including an outer sheath 10, outer hose layer 12, intermediate hose layer 14, inner layer 16 including inner layer hoses 18 and fillers 20, and a central hollow core or conduit 22. As illustrated, the outer hose layer 12 includes twenty-four hoses, the intermediate hose layer 14 includes sixteen hoses and the inner layer 16 includes three hoses, e.g., hoses 18, with the fillers 20, e.g., jute rope, serving to fill spaces between the three inner layer hoses 18, the intermediate layer 14 hoses and the core 22. As will be appreciated, the total number of hoses included in a bundle can be varied depending upon the number of functions needed for a particular application. Typically, some non-used hoses are included to provide extra or spare hoses in the event that, e.g., one or more hoses fails in service.

For the purposes of manufacture using a cabling machine such as that taught in U.S. Pat. No. 4,309,869 to Boyce, the teachings of which are hereby incorporated by reference, each layer is separated by an appropriate wrap to prevent improper positioning between adjacent hose layers during assembly, e.g., wrap 24a between the outer sheath 10 and the layer 12, wrap 24b between the layers 12 and 14, and wrap 24c between the layers 14 and 16. The outer sheath 10 may be any suitable exterior covering, and is conveniently formed of an inexpensive extrudable material such as polyurethane, polyethylene, or the like.

Although the hoses may be any material suitable for the particular application and environment of use, in a bundle to be used for connecting control equipment to an underwater petroleum well, the hoses and core are typically formed of a flexible plastic material such as nylon or thermoplastic polyester, each hose and the core 22 usually having a urethane outer jacket thereover.

Turning now to the description of a preferred embodiment of the instant invention, with reference to FIG. 2, there is shown a hose bundle B also including, for purposes of illustrating the invention, a total of thirty-three hoses disposed about the central core 22. An outer layer of hoses 30 includes twenty-five closely spaced hoses 30a, an inner layer 32 includes eighteen closely spaced hoses 32a with the inner layer 32 spaced from the inner core 22 by an intermediate layer or inner sleeve 34.

By interposing the inner sleeve 34 between the inner core 22 and the first or inner layer of hoses 32 in accordance with the instant invention, the same number of hoses as those in the prior art illustration of FIG. 1 can be formed into a unitized bundle without the need for fillers. In addition, by practicing the instant invention, these thirty-three hoses can be incorporated in the bundle B without the need for an additional or third layer such as the layer 16 in FIG. 1 which contains less than a complete layer of hoses. In this manner, the number of passes through the cabling machine is minimized. In the illustrated embodiment, for example, the ability to dispose the required number of hoses in the two rather than three layers permits manufacturing the bundle B in a single pass through the cabling machine taught in U.S. Pat. No. 4,309,869 referenced above.

The inner sleeve 34 primarily builds up the diameter of the inner core 22 to a predetermined diameter depending upon the number and size of the hoses needed for the particular bundle B and the desired completed diameter of the bundle B. In the illustrated embodiment, for example, both of the bundles A and B include a total of thirty-three hoses, each hose having an outer diameter of about 0.9 mm, the inner core 22 having an outer diameter of about 2.35 mm and the outer sheath 10 having a thickness of about 0.9 mm. The complete bundles A and B each have an outer diameter of about 10.2 mm. With reference to FIG. 2, the inner sleeve 34, in accordance with the illustrated embodiment of the instant invention, has a thickness of about 1.1 mm to build up the inner core from an outer diameter of 2.3 mm to 4.5 mm.

As another example illustrating the invention, for a bundle requiring a total of fifty-five hoses, each hose having an outer diameter of about 0.9 mm, the instant invention enables the hoses to be disposed in two concentric layers, the inner layer including twenty-four hoses and the outer layer including thirty-one hoses, without the use of fillers, by including an inner sleeve having a thickness of about 1.0 mm to build up the inner core to an outer diameter of about 4.35 mm. The resulting unitized bundle has an outside diameter of about 11.6 mm. These dimensions are given for purposes of illustration and are not limiting to the invention. For any given hose size, core size, overall bundle diameter, and number of hoses, an optimal thickness of the inner sleeve can be determined to permit the hoses to be disposed in a minimum number of concentric layers with either no fillers or a minimum amount of filler.

In the preferred embodiment of the invention, the inner sleeve 34 is formed of an inexpensive flexible, plastic, extrudable material such as polyvinyl chloride, high or low density polyethylene, thermoplastic rubber or the like. Before using the cabling machine, the inner sleeve of predetermined thickness is extruded over the inner core 22. The cabling machine can then be used to simultaneously lay both the layers 32 and 30 of the hoses 32a and 30a respectively over the inner sleeve 34, e.g. in a single pass through the cabling machine taught in U.S. Pat. No. 4,309,869, and the outer sleeve 10 extruded over the entire assembly to form the unitized bundle B.

When the inner core, the inner sleeve, the hoses and the outer sleeve are flexible, the inner sleeve 34 adds to the strength and durability of the entire bundle. By including a flexible layer within the bundle, its bending diameter is increased to lessen the risk of bundle kinking and its associated damage. The resilience of the inner sleeve also serves as a cushion against impact, e.g., between the inner core 22 and the hoses 32a to decrease the overall impact resistance of the bundle B.

With reference to FIG. 3, for connecting the inner core 22 to its associated control device (not shown), it is preferable to remove an end portion 36 of the inner sleeve 34 to expose outer surface 22a of the inner core 22. It is therefore preferred that the inner sleeve material be such that it does not adhere to the outer surface 22a. When the inner sleeve 34 is applied by extruding it over the inner core 22, to avoid thermal bonding, and prevent adherence of the inner sleeve 34 to the core 22, it is preferred that the inner sleeve material be selected from a material characterized by its having a lower deformation temperature than the inner core material.

Returning to the preferred embodiment, as best shown in FIG. 3, the inner core further includes a knit line 38 to facilitate removal of the end portion 36 of the inner sleeve 34 for connecting the inner core 22 to associated control devices. The knit line is provided during the extrusion process in a manner known in the extrusion art to provide a weakness or tear line along which the inner sleeve may be split for stripping thereof.

As can now be appreciated, the inner sleeve 34 provides the unitized bundle B with a substantially cylindrical shape, which shape will be maintained in service. In addition, the inner sleeve 34 provides increased impact resistance and bending diameter for increased durability in service. Furthermore, the bundle B manufactured in accordance with the teachings of the invention decreases manufacturing costs by decreasing the number of passes through the cabling machine required to assemble the bundle B.

The foregoing disclosure and description of the invention are illustrative and explanatory thereof, and various changes in the size, shape and materials, as well as in the details of the illustrated construction can be made.

For example, although forming the inner sleeve by extrusion of an expensive thermoplastic material over an inner core tubing is preferred for ease and cost of manufacture, other techniques for providing the inner sleeve 34 as will be apparent to one skilled in the art may be used. For example, any suitable sheet type, preferably resilient, material may be wrapped about or otherwise disposed about the central core to provide a spacing layer of suitable thickness. Similar modifications as will readily occur to one skilled in the art may be made without departing from the spirit of the invention, the scope of which is defined by the claims which follow.

What is claimed is:

1. A method of forming a unitized bundle of conduits comprising the steps of:
    providing a substantially cylindrical inner core having a predetermined diameter;
    disposing about the inner core an inner sleeve having a predetermined thickness;
    disposing about said inner sleeve an annular row of closely positioned adjacent conduits, each conduit having substantially the same diameter to provide an assembly having a substantially cylindrical outer shape;
    predetermining the thickness of said inner sleeve based upon the member of the conduits in said annular row and their individual diameters relative to the diameter of the inner core so as to fill the cylindrical area between the inner core and the inner surfaces of said conduits with said inner sleeve when said conduits are disposed in said annular row adjacent to each other in the substantially cylindrical outer shape; and
    providing an outer substantially cylindrical sleeve about said conduits for unitizing the core and conduits in a conduit bundle.

2. The method as set forth in claim 1, wherein said inner sleeve disposing step includes:
    extruding a thermoplastic material over the inner core of said predetermined thickness prior to positioning said conduits thereon.

3. The method as set forth in claim 2, wherein said material which is extruded does not adhere to material forming the exterior surface of the inner core.

4. The method as set forth in claim 3, wherein a longitudinal knit line is formed in the extruded material.

5. The method of forming a unitized bundle of conduits comprising the steps of:
    providing a substantially cylindrical inner core having a predetermined diameter;
    disposing about the inner core an inner sleeve;
    disposing about said inner sleeve an annular row of closely positioned conduits with adjacent conduits in substantial contact with each other;
    varying the thickness of said inner sleeve to enable the positioning of a variable number of conduits in the annular row; and
    providing an outer sleeve about said conduits for unitizing the core and conduits in a conduit bundle.

6. The method of claim 5, wherein said inner sleeve disposing step includes:
    extruding a thermoplastic material over the inner core.

7. The method of claim 6, wherein said extruding step is practiced using a material which does not adhere to material forming the exterior surface of the inner core.

8. The method as set forth in claim 7, wherein said extrusion step is further practiced to provide a longitudinal knit line in the external material.

* * * * *

UNITED STATES PATENT AND TRADEMARK OFFICE
CERTIFICATE OF CORRECTION

PATENT NO. : 4,684,427

DATED : Aug. 4, 1987

INVENTOR(S) : Earl D. Abernathy

It is certified that error appears in the above-identified patent and that said Letters Patent is hereby corrected as shown below:

In col. 6, line 20, "member" should be -- number --.

Signed and Sealed this

Twelfth Day of April, 1988

Attest:

DONALD J. QUIGG

Attesting Officer

Commissioner of Patents and Trademarks